United States Patent
Cass

[15] 3,699,563
[45] Oct. 17, 1972

[54] WHEEL SLIP DETECTOR

[72] Inventor: George R. Cass, Montreal, Quebec, Canada

[73] Assignee: Canadian National Railway Company, Montreal, Quebec, Canada

[22] Filed: Nov. 25, 1969

[21] Appl. No.: 879,726

Related U.S. Application Data

[62] Division of Ser. No. 691,669, Nov. 21, 1967, abandoned.

[52] U.S. Cl. .................................. 340/268, 340/271
[51] Int. Cl. ............................................. G08b 21/00
[58] Field of Search ....... 340/268, 271, 263; 324/161

[56] References Cited

UNITED STATES PATENTS

| | | | |
|---|---|---|---|
| 2,735,090 | 2/1956 | Maenpaa | 340/268 |
| 3,146,432 | 8/1964 | Johnson | 340/263 |

*Primary Examiner*—John W. Caldwell
*Assistant Examiner*—Michael Slobasky
*Attorney*—Fetherstonhaugh & Co.

[57] ABSTRACT

The fact that one drive axle of a railway locomotive is rotating faster than another due to 'wheel slip' of the wheels on the faster driving axle is detected by the circuitry of this invention. The rotation of each of two or more drive axles is caused to generate a cyclically varying signal which cyclic variation includes a frequency proportional to the rotational speed of the drive axle. The circuitry provides a signal whose magnitude varies as such frequency and the magnitudes of such signals are compared with each other to obtain an indication of wheel slip of an undesirable amount. A power supply and associated circuitry are provided for deriving from the locomotive supply potentials for operating the electronic circuitry of the wheel slip detector. Such power supply is arranged to eliminate the effects of voltage surges and fluctuations from the locomotive supply, to create alternating current from the direct current supply, transform such current, rectify and regulate it. Such supply is useful for the wheel slip detector circuitry and for other electrical functions.

5 Claims, 8 Drawing Figures

INVENTOR
G. R. CASS
By
Fetherstonhaugh & Co
ATTORNEYS

INVENTOR
G R. CASS

INVENTOR
G. R. CASS
By
Fetherstonhaugh & Co.
ATTORNEYS

WHEEL SLIP DETECTOR

This application is a division of application Ser. No. 691,669, now abandoned, in the name of George R. Cass, filed Nov. 21, 1967.

This invention relates to means for detecting wheel slip in one or more drive wheels of a railway locomotive having a plurality of drive axles.

This invention provides means and a method for detecting in a locomotive the fact that the wheels attached to one drive axle of such locomotive are rotating faster than the wheels attached to another drive axle of such locomotive. This situation, which is known as "wheel slip" and which results in excessive wheel and rail wear and shortening of motor life, is thus detected.

Prior methods of detecting wheel slip in locomotives using diesel electric motors use the the electrical characteristics of the motors to find their speed. However this method has suffered from a number of disadvantages. The electrical relationships between the two motors has been too variable to give good indications of motor speed differential. Moreover many diesel electric locomotives use motors in series at low speeds and while the motors were connected in parallel at high speed. After the transition to parallel connection, the detection of wheel slip has, with conventional methods, been less reliable. Because the tractive effort is reduced at these higher speeds it was previously thought that the slippage of wheels was rare. However, the large numbers of motors failing due to overspeed has pointed out the significance of high speed wheel slips and investigation has shown that such high speed wheel slips do take place.

One aspect of the invention to be hereinafter described overcomes to a great extent the disadvantages of prior methods of detecting wheel slip.

One aspect of the invention, broadly defined, provides means and a method for deriving from the rotation of a drive axle a cyclically varying signal whose frequency varies with the rotational speed of the wheel or axle and deriving therefrom a signal indicative of such frequency. The information thus derived may be used in a number of manners but preferably such a frequency indicative signal is derived from each of at least two drive axles and by comparison of said frequency indicative signals a determination is made of the difference of axle speeds indicated by comparison of such signals; wheel slip or an intolerable amount thereof being thereby detected.

Preferably the signal indicative of frequency (and hence of axle speed) is a voltage whose amplitude indicates such frequency.

The preferred steps for carrying out the preferred method and the preferred means for carrying out the above transactions is to derive from a locomotive drive axle rotation (or from a mechanical rotation proportional thereto) a periodic wave from which is derived a square wave. From the square wave from which is derived a pulse and from such pulse is derived a signal of fixed duration. The signal of fixed duration is used to generate a signal of the same duration and constant amplitude and it will be seen that there is thus provided a "constant area signal" (the 'area' being the product of voltage amplitude times duration). The amplitude and duration of the constant area signal are therefore independent of the supplied signal but its frequency corresponds to that of the supplied signal. From the "constant area signal" is derived a signal indicative of said frequency. A number of such last mentioned signals each derived from a different drive axle allows for comparison of such frequency indicative signals and means are provided to give an indication if the difference in such signals (such difference being indicative of wheel slip) is such that wheel slip is occurring or occurring in an intolerable amount.

In this manner a very much improved means and method of detecting wheel slip has been provided. It has been found that such a device may be conveniently and practically constructed to detect wheel slips when the difference of axle speeds (when converted to wheel speeds) exceeds 10 percent of road speed plus 10 miles per hour. This is found to be more accurate than prior methods. The device will operate on battery power from the locomotive and may be well protected from transients occurring in the locomotive battery line. The equipment has been found to operate at cab temperature from 0° to 150° F. and at any ambient temperature. The device is further able to measure wheel slip at speeds above 50 miles per hour and above the point at which motors series-connected at low speeds switch to parallel connection. It is thus possible, with the novel device, to detect for elimination, the existence of wheel slip at high speed. Moreover the detector developed is economical to produce and convenient to use and lends itself to the attachment of accessories such as means for measuring road speed, slip speed, miles travelled over speed and transition i.e. transition from series to parallel connection, or vice versa.

There is also provided herein a novel method for using the direct current output of a railway locomotive to power electronic circuitry while protecting such circuitry from voltage transients and voltage fluctuations due to the use of a megger, said transients and fluctuations appearing in the normal railway locomotive direct current voltages. Such connecting and protective circuitry is useful with the wheel slip detector circuitry described herein or with other electronic circuitry which it is desired to power by the locomotive power.

Figure 1:
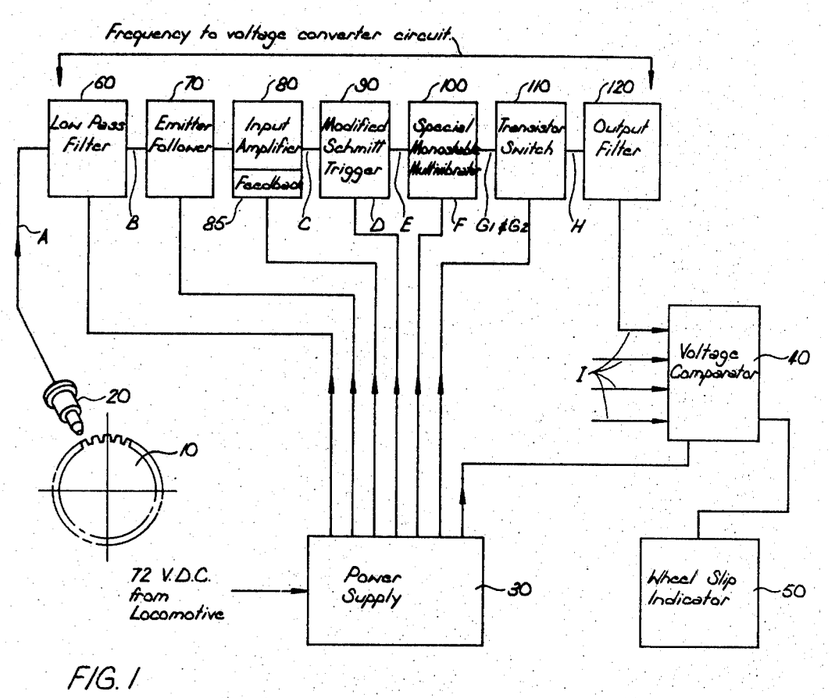
FIG. 1 shows a block diagram of the circuitry for carrying out the invention.
Figure 2:
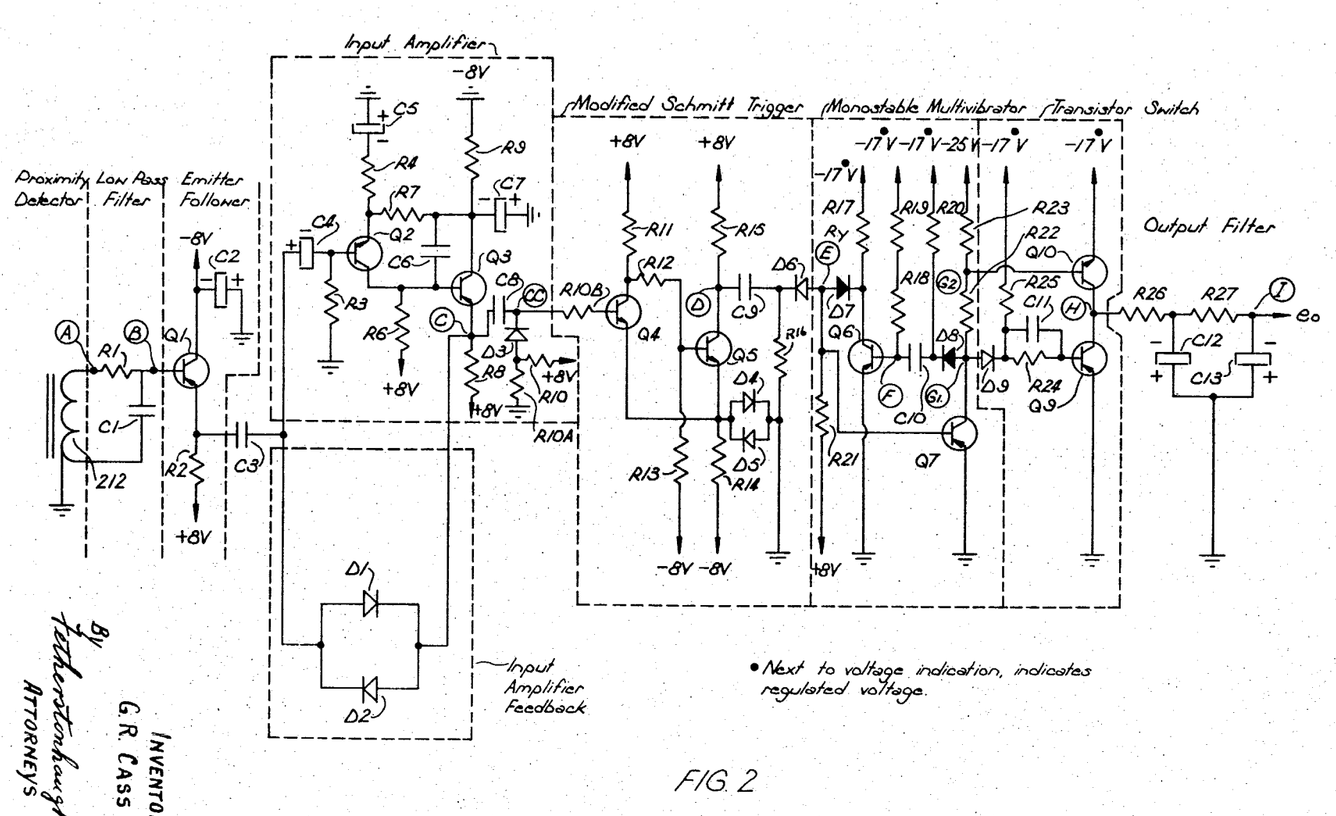
FIG. 2 is a detail drawing of the circuitry for carrying out the invention.
Figures 3, 4, 5:
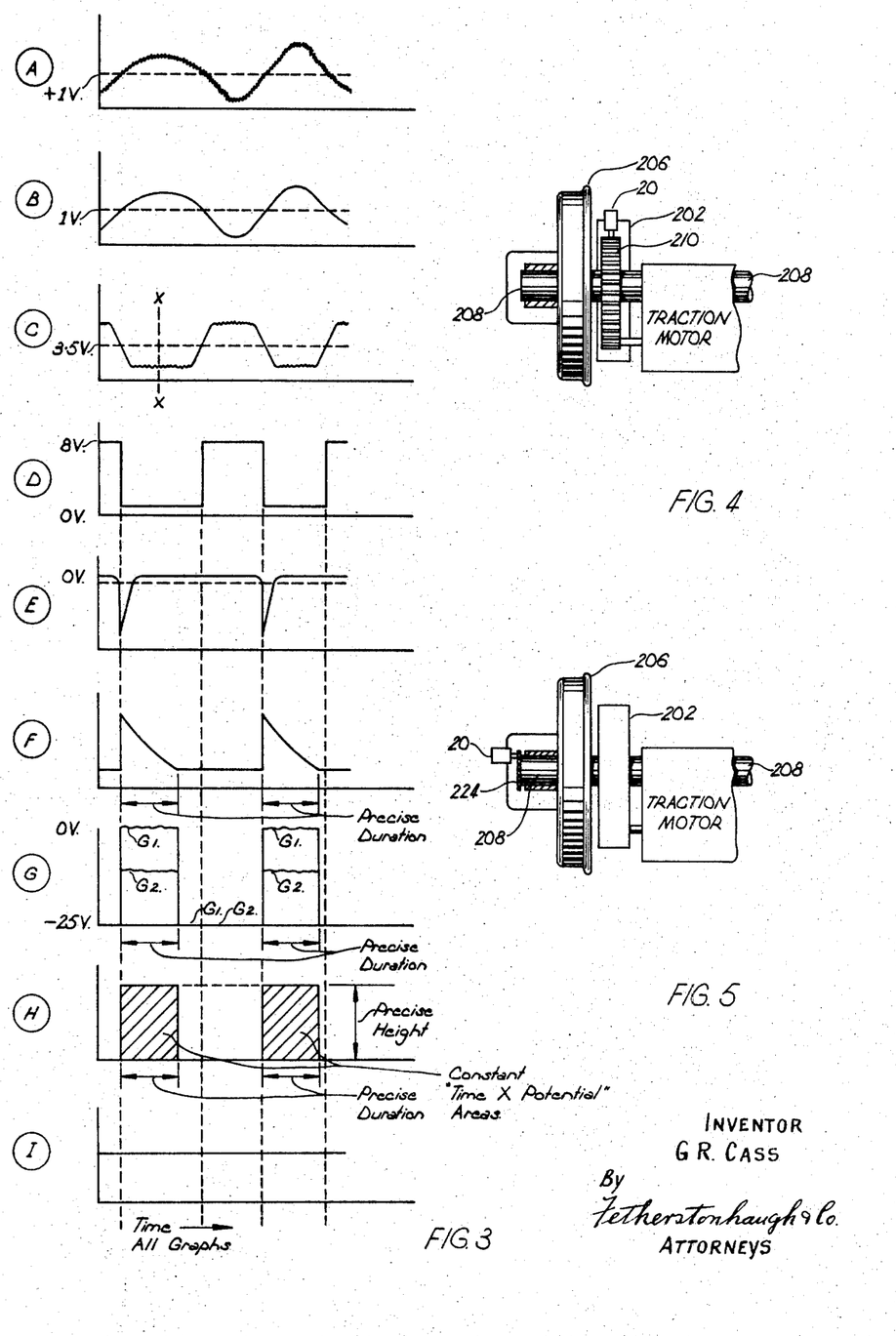
FIG. 3 is a number of graphs showing wave forms, at various parts of the circuitry of FIG. 1.
FIGS. 4 and 5 show methods of mounting the proximity detector.

FIG. 1 shows a block diagram of the circuitry of the invention and FIG. 3 indicates the shapes of signals produced therein. In FIG. 1 is schematically indicated a toothed disc or gear 10 which would be attached to a drive axle for rotation therewith and a proximity detector 20 for deriving cyclically varying signal from said toothed member and supplying such cyclically varying signal A to a frequency to voltage converter circuit, the frequency being determined by the number of axle teeth and the speed of rotation of the drive axle. Also shown is a power supply 30 for supplying to the circuitry, voltages of the level and polarity required. The power supply 30 includes a regulated voltage supply for some portions of the circuitry as hereinafter described. The leads or connections from the power supply shown in FIG. 1 are for schematic indication only and do not correspond to individual wires and may represent a plurality of power supply connections. The individual supply wires are indicated in FIG. 2. The voltage for the power supply 30 is provided, preferably from the 72 volt DC supply of the locomotive.

The output of the proximity detector 20 which is, with complicating factors to be explained hereafter, basically a signal having a frequency proportional to drive axle speed, is passed through those blocks or circuitry designated collectively in FIG. 1 as a frequency to voltage converter, producing a voltage varying as the proximity detected frequency and hence shaft speed. Such a voltage, proportional to shaft speed, is individually developed for each locomotive drive axle being monitored, and such voltages are compared at a voltage comparator 40 to obtain a detection of the existence of wheel slip.

It is here assumed that the locomotive with which the equipment is used has four drive axles being monitored.

The detection of wheel slip is used to actuate a wheel slip indicator 50.

The frequency to voltage indicator comprises a low pass filter 60 for eliminating unwanted high frequency components superimposed upon the proximity detector signal; having an output B, an emitter follower stage presenting a high impedance to the signal from the proximity detector to avoid the loading of the latter. The output of the emitter follower is fed to an input amplifier which amplifies the signal and whose performance is affected by a feedback circuit 85 and which produces an output C. The output of the amplifier is connected to a modified Schmitt Trigger where the frequency proportional to axial speed is used to generate square waves D of the same frequency. The output of the Schmitt Trigger 90 is differentiated and the negative pulses E are used to trigger a special monostable multivibrator 100 which provides, in response to each negative pulse, pulses of fixed duration F and then G1 and G2 determined by the specialized design of the multivibrator 100. The pulses from the multivibrator are supplied to specialized transistor switch circuitry 110 wherein there are produced pulses H of the duration determined by multivibrator 100 and of equal height. Such 'constant area' pulses H which in number vary as axle speed are then supplied to an output filter which produces, from such pulses a voltage I whose amplitude varies as axle speed. Such voltage is supplied to the comparator 40 for each of the drive axles being monitored. Before entering into the discussion of specific circuitry it should be noted that the description and the drawings will, from time to time, indicate that a particular voltage or polarity DC supply is called for. This is for guidance only however, and it will be realized that by altering the values of the circuit in accord with techniques well known to those skilled in the art different DC supply voltage polarities or values may be used. Regulated supplies are indicated by a dot beside the voltage value.

PROXIMITY DETECTOR

Figure 6:
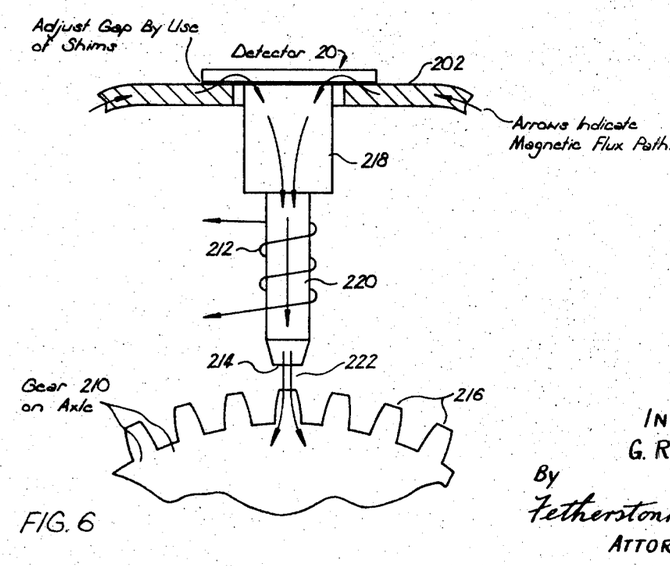
FIG. 6 shows a portion of the magnetic circuit of the proximity detector as illustrated in FIG. 4.

The proximity detector provides a signal A including pulses of frequency varying with axle speed. FIG. 4 shows the detector 20 mounted on the gear case 202 enclosing the axle drive gear 210 of a locomotive. As shown in FIG. 6 the detector comprises a permanent magnet 218 from which projects a soft iron core 220 towards and (through the gear case 202) into close proximity to the teeth 216 of gear 210. The magnetic air gap between the tip 214 of core 220 and teeth may be adjusted by shims (not shown) between detector 20 and gear case 202 (or may be adjusted in any of a number of manners well known to those skilled in the art). Surrounding the core 220 is the coil 212 of the proximity detector. A magnetic circuit is formed from the magnet 218 through the core 220 across the detector sensing tip 214, across the air gap 222 (preferably about ¼ inch) to the gear teeth 216, through the drive axle 208 and back through the gear case 202 to the magnet 218. Movement of the gear teeth 216 varies the effective width of gap 222 opposite sensing tip 214 and thus the magnetic flux passing through coil 212 varies because the reluctance of the magnetic path changes. This induces a voltage in coil 212, proportional to the number of turns, and the rate of change of flux with time through the coil. Thus the voltage varies at a frequency determined by the speed of rotation of the drive axle to which the gear 210 is attached. The voltage is roughly sinusoidal in form (see A in FIG. 3). A large number of factors can cause unwanted high and low frequency fluctuations to be superimposed upon the rough sinusoid. Axle slide play and perhaps other factors can cause a low frequency or a DC drift (as well as high frequency fluctuations) to be superimposed upon the rough sinusoid.

In the embodiment of FIG. 5, the drive gear is not used to supply the gap fluctuations. Instead a toothed disc 224 of soft magnetic material is mounted on an adjacent axle 208 and the proximity detector 20 has its core and sensing tip directed parallel to axle 208 but aligned and in proximity with the teeth and interposed spaces. It will be seen that the operation of the magnetic circuit and the mode of producing a roughly sinusoidal wave is otherwise similar to that described in connection with FIGS. 4 and 6.

In the detailed description to follow, positive and negative DC supplies are indicated by positive and negative voltages values. These are so designated to give some idea of order of magnitude and relative values to aid in the understanding and explanation of the circuitry. The invention is not intended to be limited to the values suggested.

LOW PASS FILTER

The coil 212 of the proximity detector is connected (See FIG. 2) at one end to ground while the other end is connected through a resistance R1 to the base of a transistor Q1. The connection between R1 and Q1 is connected to ground through a capacitor C1. The resistance R1 and capacitor C1 form a low pass filter to pass the frequency proportional to axle speed but to eliminate unwanted high frequency components from the signal A and to present to the input of transistor Q1 the roughly sinusoidal signal (graph B).

EMITTER FOLLOWER

The emitter of transistor Q1 is connected to +8 Volts DC through resistor R2 and the collector of transistor Q1 is connected to negative −8 Volts DC supply and also through an electrolytic capacitor C2 to emitter follower has its output connected between R2 and the emitter of Q1. The emitter follower acts as a high impedance load to the output of the proximity detector and input filter and avoids "loading" of the proximity detector coil 212.

INPUT AMPLIFIER

The emitter of transistor Q1 carrying the output signal is connected through capacitor C3 to the input amplifier stage which includes a special negative feedback connection which modifies the operation of the amplifier. Before discussing the operation and the detailed circuitry of the input amplifier, it is preferred to explain its overall operation and it will be seen that the output of the amplifier is connected to the input through a feedback line having, in parallel, semi-connector diodes D1 and D2 being arranged in opposite polarity. The connection will be such that the feedback is negative, that is, whatever the design of the amplifier the feedback through the parallel semi-conductor diodes, will be such that the effect of the feedback circuit through the diode is to counteract the effect of the input signal. It is a well known fact that ordinary semi-conductor diodes require, in the conducting direction, a definite voltage applied to them before conduction will occur, this being about 0.7 volts for silicon diodes and 0.2 volts for germanium diodes, and thus that (assuming silicon diodes are used) any deviation of the output from the input of more than 0.7 will cause feedback, through the diode poled to conduct such deviation, whereas deviations of less than this amount will not be fed back. If the amplification factor of the amplifier used is 20, then if the input signal is −0.030 volts the output is this amount times −20 giving an output 0.6 volts which will appear at the output but will not conduct through the diodes. If the input goes to −0.035 volts the amplifier output will tend to go to 0.7 volts but as this results in a drop of just greater than 0.7 volts across the diodes, D2 will conduct and will continue to conduct as the input goes more negative or as long as the difference between output and input is greater than +0.7 volts. During the conduction of D2 the signal fed back makes the input signal less negative. Thus when an inflection takes place in the input signal of from −0.035 volts to +0.035 volts during such inflection the output voltage will also swing, and about the time the input signal reaches +0.035 volts, D1 will conduct to counteract the positive swing and to limit the output to a range of just under ±0.7 volts — the output is shown as graph C. Since the diodes, when considered with the amplifier require only ±0.035 volts to conduct, inflections of this amount or greater in the input signal are detected. This seems an adequate sensitivity since the input to the amplifier stage may be designed to have a peak-to-peak variation of greater than 1 volt.

Before a detailed explanation is provided of the amplifier circuitry, which has its own specific advantages, it is pointed out that the advantages previously described are independent of the specific amplifier circuitry, and merely require an amplifier with a negative feedback line through parallel diodes of opposed polarity where the drop across the diodes in the conducting direction may be predetermined.

Dealing, now, specifically with the amplifier circuitry, the output side of condenser C3 is connected between the input side of capacitor C4 and the output side of parallel opposed diodes D1 and D2. The output side of capacitor C4 is connected to the base of an NPN transistor Q2, with the base also being connected to ground through resistor R3. Transistor Q2 has its emitter connected to ground through resistance R4 and capacitor C5 in series, and its collector connected to +8 volt DC through resistor R6 which forms the load resistor for the transistor Q2. The collector of Q2 is connected to the base of the next amplification stage being PNP transistor Q3 and the emitter of transistor Q2 is connected to the collector of Q3 through resistor R7 while the collector and base of Q3 are connected through capacitor C6. The emitter of transistor Q3 is connected to +8 volt DC through a resistor R8 and the collector is connected to −8 volt DC through a resistor R9 and also connected to ground through an electrolytic capacitor C7. The emitter of transistor Q3 is connected to the negative feedback line containing diodes D1 and D2 in parallel as previously discussed, and the emitter of transistor Q3 carries the output signal (C of FIG. 3) from the input amplifier. The emitter of transistor Q3 is connected through electrolytic capacitor C8 and a diode D3 in series to the junction between a pair of resistances R10 and R10A. Resistances R10 and R10A are connected in series between +8 volt DC and ground. The purpose of the circuitry comprising diode D3 and resistances R10 and R10A is to provide a limit to the downward excursion of the voltage at point CC which does not however, under normal operation, affect the wave shape as indicated in graph C.

R3 provides DC bias for transistor Q2. It is noted that the emitter of Q2 is returned through R7 and R9 to the −8 V. supply to allow forward biasing of the Q2 base-emitter junction. The purpose of C4 is to act as a DC block and to allow only AC signals to be applied to the base of transistor Q2. Thus the quiescent operating point of the emitter of transistor Q3 does not affect the voltage level of the base of Q2 to which it is connected through the diodes and C4, and only the changes in level of the Q3 emitter which are transmitted through the diodes reach the base of Q2 through C4.

In operation, the signal of the shape of graph B, is applied at the base of Q2. A signal going positive relative to the emitter of Q2 to increase conduction lowers the collector voltage of Q2 being the voltage of the base of Q3, increasing the conduction through Q3 and lowering the output voltage at C. A signal going negative at the base of Q2 has the opposite effect. In either event, the negative feedback line through D1 and D2 has the effect of limiting the output range to values where the difference between the output at point C and the input between C3 and C4 is never greater than 0.7 volts. The presence of the capacitor C5 tends to make the DC gain approach 1. At a limit determined by the characteristics of R4 and C5 (being the lower frequency level for which the amplifier is to be used) the capacitor C5 begins to act as an AC ground and the AC gain is limited by the values of R7/R7+R4 the ratio varying inversely as the negative feedback applied from the collector of Q3 to the emitter of Q2, and thus setting an upper limit for the AC gain.

Under temperature changes the individual values of R7 and R4 may vary but the resistances may be chosen so that the value of the ratio R7/R7+R4 remains substantially the same and hence good temperature stability is provided by the amplifier.

The capacitor C6 tends to act as a short circuit to frequencies above a certain level and therefore above such level acts as a negative feedback between the collector and base of Q3 thus setting the upper frequency limit for the amplifier operation.

The amplifier has a number of unique and advantageous features. Low output impedance is provided by the fact that the conduction and potentiometer setting of D3 is preferably set to take place when point CC attempts to go more negative than −0.5 volts. Thus the negative swing of the voltage is limited to the above value, (producing a voltage of the shape of graph C with its lowest swing at or just above −0.5 volts) and when such limiting occurs the positive plate of C8 will draw charging current from the +8 volts emitter supply of Q3. Should this charging current be large enough to unduly reduce the current that runs through Q3, the charge on C7 provides a reservoir for the supply of current if this should happen.

The result is an amplifier allowing for large changes in current with small changes in output voltage and hence low output impedance.

Since the alternating current gain is controlled by the resistances R7 and R4, high temperature stability is achieved due to the temperature compensating features of the circuitry used.

Due to the low DC gain, DC drift will not be amplified and the amplifier provides high potential AC gain of which any percentage may be used depending on the value of R4 and R7 and a high band width which may have a lower cut-off frequency of 10 cycles per second, the band width, as previously explained, being determined at the upper limit by the value of capacitor C6 and at the lower limit by the value of R4 and C5.

MODIFIED SCHMITT TRIGGER

The output of capacitor C8 shaped as in graph C is connected through a resistance R10B to the input of the Schmitt Trigger and within the Schmitt Trigger to the base of an NPN transistor Q4. The collector of transistor Q4 is connected through a resistance R11 to +8 volts DC and through resistances $R_{12}$ and $R_{13}$ to −8 volts DC. The +8 volts DC and the −8 volts DC connections connected through resistances R11, R12 and R13 in series provide that the base of Q5 will be at a predetermined potential level. The emitter of Q4 is connected to −8 volts DC through a resistor R14. The line between resistor R12 and R13 is connected to the base of an NPN transistor Q5. The emitter of transistor Q5 is connected to the junction between the resistor R14 and the emitter of transistor Q4 i.e. the emitters of transistors Q4 and Q5 are connected to ground through a common resistor R14. The collector of transistor Q5 is connected to +8 volts DC through a resistor R15 and is also connected through a capacitor C9 and resistor R16 to ground. The point of connection between the capacitor C9 and the resistor R16 is connected through diode D6 to form the output connection of the circuit at point F. Diode D6 is poled to conduct toward C9. The emitter of transistor Q5 is also connected to ground through germanium diodes D4 and D5 in parallel. The diodes D4 and D5 are poled in opposite directions.

The operation of the modified Schmitt Trigger, uses the parallel oppositely poled Germanium diodes D4 and D5 to maintain the emitters of transistors Q4 and Q5 at between ±0.2 volts. At time X—X see graph C, the base of transistor Q4 is below the conduction point relative to the emitter. With Q4 therefore non-conducting, Q5 (in accord with its base bias) is conducting, and the output at point D (and see graph) will be nearly 0 volts. As the voltage at the base of Q4 goes positive to the point where conduction in Q4 commences, causing Q5 to stop conducting. The output voltage D then rapidly goes to the level of the +8 volts supply for the collector of Q5, where it remains until the input to the base of Q4 again goes below the cut-off level for Q4 again ceases to conduct and Q5 is switched on, the voltage again returning to substantially its former value of nearly 0 volts. The biasing resistors in the modified Schmitt Trigger circuit are preferably chosen so that whichever of transistors Q4 and Q5 is conducting, is operating under saturation conditions. The effect of the parallel but opposed diodes D4 and D5 is to ensure that a voltage swing of ±0.2 volts is sufficient to swing the modified Schmitt Trigger from one state to the other. The stages preceding the modified Schmitt Trigger may easily be designed to produce an input to the stage of ±1 volt so that reliable Schmitt Trigger operation is assured. A further advantage of the parallel reverse poled diodes is that they effectively provide, an adequate path for current for saturation current to whichever is the 'on' transistor from time to time. As is well known this is desirable in Schmitt Trigger operation.

Point D At the collector of Q5 is connected through capacitor C9 to a differentiating circuit, comprising the capacitor C9 and the resistor R16. This produces from the square wave D, a positive pulse for the rising edge of the square wave and negative pulse for the falling edge. The differentiator output is connected through diode D6 poled to pass only the negative pulse. The output of the diode D6 is shown in graph E.

MONOSTABLE MULTIVIBRATOR

The output of D6 is connected to the input of a monostable multivibrator being connected to the collector of a PNP transistor Q6 through a diode D7 poled to conduct toward Q6. The collector of transistor Q6 is connected to a regulated −17 bolts DC supply through a resistor R17. The emitter of transistor Q6 is connected to ground. The base of transistor Q6 is connected to regulated −17 volts DC supply through resistor $R_{18}$ and variable resistor $R_{19}$ in series. The base of transistor Q6 is also connected through condenser C10 and resistor R20 to the regulated −17 volts supply. The point E between diodes D6 and D7 is connected to a +8 volts DC supply through a resistor R21 and point E is also connected to the base of a PNP transistor Q7 whose emitter is connected to ground. The collector of transistor Q7 is connected through resistors R22 and R23 in series to −25 volts DC. The collector of transistor Q7 is connected to the base of transistor Q6 through diode D8 and condenser C10, in series, with the diode poled to conduct from the collector of Q7 toward C10.

In operation, in the absence of a negative pulse at E, transistor Q6 is biased to be normally conducting and transistor Q7 non-conducting. point E is at near but just above ground potential so that Q7 is biased to the non-conducting state by a slight reverse bias. The potential between capacitor C10 and the base of Q6 is sufficiently less than 0 volts (this will usually be −0.6V) for Q6 to be turned on. It should be noted that the collector of Q7 is at −25 volts and that due to the presence of D8, the point between D8 and C10 is at a regulated −17 volts. A negative pulse passing through D6 appears at the base of Q7 and turns Q7 on and raises the collector of Q7 (point G1) to substantially ground potential. At the same time point G2 (between R22 and R23) rises to a potential intermediate 0V and −25 volts the potential level being determined by the relative values of R22 and R23. The substantial 0 voltage at G1 is applied through diode D8 to the point between D8 and C10 causing a regulated 17 volt positive surge at the capacitor C10 raising the point F to a + 17 volts (in effect a regulated value due to the regulated surge). This results in the shutting off of Q6 with consequent drop in the potential of the Q6 collector. This provides a potentiometer from +8 volts through $R_{21}$, point D7 and R17 to −17. The divider is designed to apply a negative potential to the base of Q7 holding it on for as long as Q6 is off. The transistors Q6 and Q7 remain in this state for the length of time required for C10 to discharge through R18 and R19 to the potential at which Q6 turns on. When this occurs, the potentiometer through R21, D7 and R17 is disrupted by the rise in voltage at the collector of Q6, and the potential at point E rises to turn Q7 off. The time for discharge of C10 to the turn on value of R18 and R19 provides the precise pulse length desired of the system as determined by the C10 (R18 + R19) time constant. It is noted that the precision and constancy of this time of discharge is affected by the fact that the point F raised to a regulated +17 volts and is discharging through R18 and R19 to a regulated −17 volts. The time of discharge may of course be adjusted by adjusting R19. During the absence of such pulse the collector of Q7 point G1 is at −25 volts and the point G2 between R22 and R23 is also at −25 volts. During the presence of such pulse point G1 is at substantially 0 volts and the point G2 is intermediate 0 volts and −25 volts as previously explained. The circuit is specially designed to ensure that the device is temperature compensated to provide an output pulse of substantially the same duration over varying temperature ranges. This is achieved by choosing a matching D8 and Q6 in such a way that, for a given temperature change, the sense and magnitude of the change of voltage drop across D8 is substantially the same as the change of voltage drop (at the conductor turn-on' point) from the emitter to the base of Q6. In this way if a temperature change causes a 0.1 volt increase in the drop across D8 then the point F is 0.1 volt lower, at the time of the initiation of a pulse, however, due to the corresponding increase of 0.1 volt drop of the 'turn on' base voltage of Q6, the point F must fall through the same voltage range, as before, to turn on Q6. D5 also ensures a squarer output from the multivibrator at the time when Q7 ceases to 'This is assisted by having R20 less than the sum of R22 and R23. D5 assures a squarer wave because when Q7 ceases to conduct, the voltage at its collector drops to −25 volts thereby back biasing D8 and disconnecting C10 from R22 and R23. The recharging of C10 to −17V. is now accomplished through R20 without substantially affecting the output wave form. When Q7 turns on again, D8 begins conduction and forces the junction of C10, R20 and D8 to −0.6 volts (in the example being given). This action causes the voltage between C10 and the base of Q6 to change from −0.6V (for example) being the base voltage of Q6 where Q6 is conducting to (e.g.) 15.8 volts (i.e. a change of 17V−0.6V or 16.4V where 0.6V is the voltage drop across D8 when it is in conduction.

TRANSISTOR SWITCH

The output of the monostable multivibrator may be considered as a dual one from G1 and from G2. The point G1 is thus connected through diode D9 and resistor R24 in series to the base of a PNP transistor Q9.

The diode D9 is poled to carry current from the collector or of Q7 toward R24. A condenser C11 is connected in parallel with resistor R24. The point G2 is connected to the base of an NPN transistor Q10.

A regulated −17 volts DC source is connected through a resistor R25 to the junction of D9, C11 and R24.

Transistor Q9 has its emitter connected to ground and its collector connected to the collector of a transistor Q10 whose emitter is connected to a regulated −17 volts source. The output of the transistor switch circuit is taken at point H between the collectors of Q9 and Q10. With Q7 non-conducting, i.e. during the non-time portion of signal G1, −17 volts is applied to the base of Q9 from the regulated −17 volt supply through R25 and R24. Q9 therefore conducts. At the same time G2 is at −25 volts, maintaining Q10 off.

Thus point H is, due to conduction in Q9, substantially at ground potential.

On the initiation of conduction in Q7, i.e. the initiation of the precise duration pulse, the resultant potential G1 at the collector of Q7 rises to substantially 0 volts to turn off Q9. On the other hand, the potential at G2 rises to a sufficient value to turn on Q10. As a result of conduction in Q10, the potential at H becomes substantially −17 volts and this situation remains for the precise duration pulse. At the end of the timed duration pulse, Q7 switches off, Q9 is switched on, Q10 is switched off, both for the reasons discussed in connection with the starting conditions and the potential of H returns to substantially ground potential. Thus point H is substantially −17 volts for the timed interval and substantially ground for the remainder of this time. Thus for the precise interval determined by the monostable multivibrator, there is provided a precise pulse amplitude determined by the transistor switch. The time-amplitude 'area' of each pulse is the same and the number of pulses is directly proportional to axle speed. The pulses may therefore be converted by an output filter to a voltage whose magnitude is proportional to the number of pulses and hence to axle speed.

OUTPUT FILTER

The output filter may be of well known design and preferably comprises a resistor R26 connected to point H and a resistor R27 connected in series with R26. The point between R26 and R27 is connected to ground through electrolytic capacitor C12. The output side of R27 being the output side of the filter is connected to ground through electrolytic C13. The output of the filter is a DC voltage I of magnitude determined by the frequency of 'constant area' pulses at the filter input. It will be obvious that, if necessary, further R.C. stages may be added to the filter to further smooth the DC output. This is not felt to be normally necessary.

It will be seen that a voltage as shown at I may be derived corresponding to each drive axle speed by connecting each drive axle to a circuit as so far described. These potentials may thus be compared in any one of a number of known manners to obtain a measure of the difference of drive axle speed. Such difference of drive axle speed is, of course, a measure of wheel slip.

WHEEL SLIP DETECTOR

Figure 7:
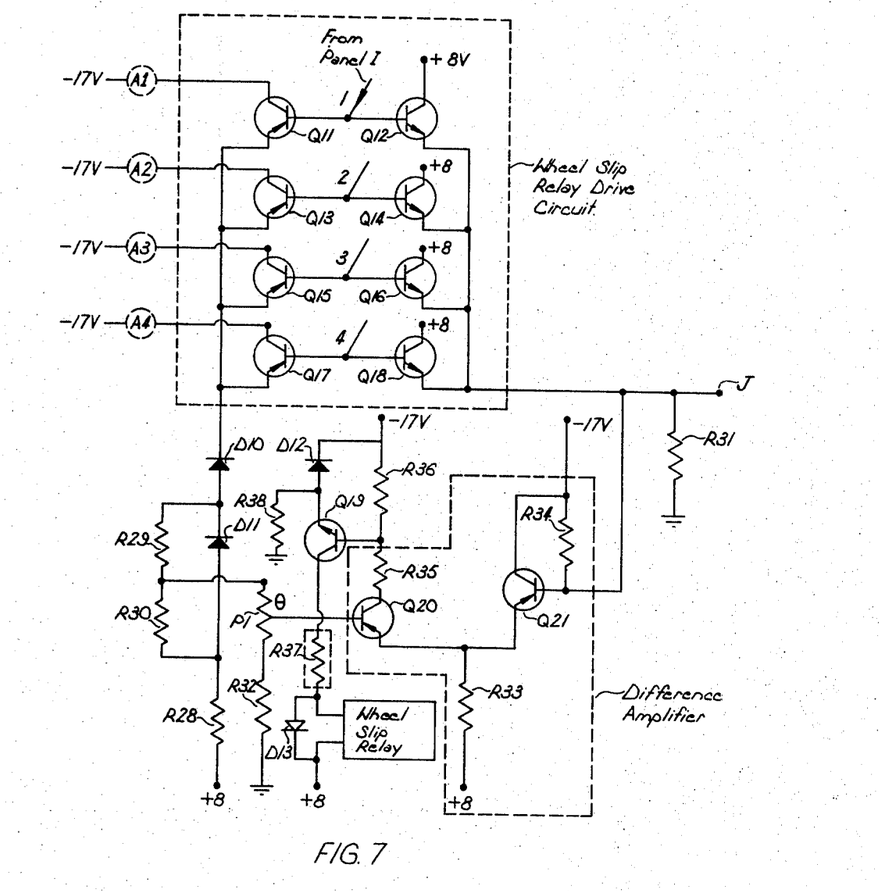
FIG. 7 shows preferred circuitry for comparing the signals characteristic of several drive axles.

There is now described one preferred method of detecting such wheel slip. There is shown in FIG. 7 circuitry for comparing the voltages produced from the various drive wheel axles and in the drawing are shown four transistors Q11, Q13, Q15 and Q17 all of the PNP type whose emitters are connected together. The emitters are connected to +8 volts DC through the diodes D10, D11 and resistor R28, in series, with the diodes D10 and D11 being poled to conduct from the +8 volts DC source toward the emitters. Resistances R29 and R30 are placed in series with each other and in parallel with the diode D11. The collectors of the transistors Q11, Q13, Q15 and Q17 are each connected to −17 volts DC. The collectors of from NPN transistors Q12, Q14 and Q16 and Q18 are connected to a +8 volts DC and the emitters of each of the transistors Q12, Q14, Q16 and Q18 are connected together and the common point to ground through a resistor R31.

The bases of transistors Q11, Q13, Q15 and Q17 are respectively connected to the bases of transistors Q12, Q14, Q16 and Q18. The numerals '1', '2', '3' and '4' intermediate the base connections represent the point of connection for the voltage I from a frequency to voltage conversion circuits of FIG. 2, which are connected to and characteristic of each of four drive axles. The point between R29 and R30 is connected to ground through the input of potentiometer P1 and resistance R32 in series and the output terminal of the potentiometer P1 is connected to the base of PNP transistor Q20 forming one of the two transistors of a difference amplifier. The emitters of transistors Q12, Q14, Q16 and Q18 are connected to the base of the other transistor of a difference amplifier Q21. The emitters of transistors Q20 and Q21 are connected to +8 volts DC source through a resistor R33. The collector of transistor Q21 is connected to −17 volts DC and its base is connected to −17 volts through a resistor R34. The collector of transistor Q20 is connected to −17 volts DC through resistances R35 and R36 in series. A wheel slip relay circuit is provided from a +8 volts DC source, through the relay in parallel with diode D13, the latter being poled to conduct toward the +8 volts DC source, then through resistance R37 to the collector of an NPN transistor Q19. The emitter of this transistor is connected to −17 volts DC through a diode D12 poled to conduct toward the −17 volts DC source. The emitter of transistor Q19 is also connected to ground through a resistor R38. The base of transistor Q19 is connected between the resistances R35 and R36 and it will be seen that these are selected to give the desired bias to the base of transistor Q19.

The difference amplifier is of well known construction and operating principles. Resistances R34 and R31 form a voltage divider between −17 volts DC and ground arranged to maintain (by the voltage applied to its base) transistor Q21 conducting under all operating conditions. The difference amplifier is set so that Q20 is normally non-conducting when flow is equal through transistors Q11, Q13, Q15 and Q17. The state of Q20 will vary as hereinafter described. However it will be noted that an increase in flow in either one of transistors Q20 or Q21 lowers the emitter potential of both transistors and reduces conduction through the other transistor. Conversely, a reduction of current flow in either one of transistors Q20 or Q21 causes a rise in the emitter potential increasing current flow in the other transistor.

In the normal condition, with no wheel slip, the bias on transistor Q19 prevents flow therethrough and the wheel slip relay is not actuated. With all drive axles rotating at the same speed, then the conduction through each of the odd numbered transistors from Q11 to Q18 is the same, as is the conduction in all the even numbered transistors. Conduction in transistor Q20 (non-conducting at this time) is controlled by the setting of potentiometer P1, and the values of resistors R29, R30, R32 and R28 and the conduction in each of transistors in Q20 and Q21 is, of course, also controlled by the condition in the other.

If then one drive axle starts to slip and hence the axle speed increases, assume that this takes place on drive axle 2, then the potential of such axle from the output of resistor R27 in its frequency to voltage circuit (see FIG. 2) will go more negative, increasing the flow of current, in transistor Q13 and decreasing the flow in transistor Q14. The increase of flow in Q13 because of the change of emitter bias on Q11, Q15 and Q17 slightly reduces the current flow through transistors Q11, Q15 and Q17 but the net effect from the increased flow in transistor Q13 is an increased flow through resistor R28 resulting in a lowering of the bias applied by potentiometer P1 to the base of Q20. The decrease in flow through Q14 has little effect on the current flow through R31.

The cumulative flow through the emitters of the odd numbered transistors of R11 to R18 is characteristic of the transistor with the highest conduction, in the example Q13, corresponding to the fastest moving drive axle, i.e. the axle having the wheels with the greatest slip. The cumulative flow through the emitters of the even numbered transistors of R11 to R18 is characteristic of the transistor with the highest conduction, in the example, one of the three transistors Q12, Q16 or Q18 corresponding to the slowest moving drive axle, i.e. the one with the least slip.

Examination of the difference amplifier will indicate that increased flow through the odd numbered transistors will lower the base potential at Q20, tending to increase the flow through Q20; while increased flow through the even numbered transistors raises the base potential of Q21, tending to lower the flow through Q21 (again tending to increase flow through Q20. Lowering of cumulative conduction through the odd numbered or the even numbered transistors will in each case have the opposite effect). The common emitter connection for Q20 and Q21, as previously explained, enhances any difference in flow between the transistors.

Thus it will be seen that Q20 tends to be governed by the axle with the most slip; while Q21 tends to be governed by the axle with the least slip, that the conduction in Q20 is a measure of the difference in speed between the fastest and the slowest drive axle and that the changes from time to in fastest and slowest drive axle speed is enhanced by the design of the difference amplifier.

The difference amplifier is designed to have, with no wheel slip, Q21 conducting and Q20 non-conducting. Q21 is designed to conduct to some extent at all times. Q19 is arranged by the bias provided by R36 to conduct as soon as Q20 conducts, and the wheel slip relay is designed to be actuated as soon as Q19 conducts. Thus the circuitry of the wheel slip detector is designed to operate the wheel slip relay in and to give an indication thereby in any desired form that wheel slip in an undesirable amount exists. Once such indication is given, the axle causing the slip may be located (by means not shown, but well known to those skilled in the art).

It will be noted that the circuitry may be adjusted to operate the relay for any desired amount of wheel slip by adjustment of the setting of potentiometer P1.

Point J is shown connected between the common junction of the emitters of the even numbered transistors in the group Q11 to Q18, and has the same potential as the base of Q21. As previously explained, the potential at such base and point J is dependent on the slowest axle speed, and since such axle will have nil wheel slip, the slowest axle speed will normally be indication of locomotive speed. Point J may therefore be used as a terminal for such accessories as a speedometer, overspeed relay, etc.

In addition to having means to indicate that wheel slip is occurring it may be desirable to indicate which of the axles is driving the slipping wheels. If this is so coils of relays A1, A2, A3 and A4 may be respectively connected between the collectors of Q11, Q13, Q15 and Q17, respectively. Thus whichever of the odd numbered transistors Q11–Q17 slips, capturing the current, will under selected conditions operate an indicator concurrently with the operation of the wheel slip relay indicating that an undesirable amount of wheel slip is taking place.

SUPPLY OF DIRECT CURRENT VOLTAGES

Power for the direct current voltages may be supplied in any desired means, and preferably will be obtained from the locomotive supply which is customarily 72 volts.

Where the power supply is obtained from the locomotive, the circuitry must accomplish two important features:

1. Elimination of the effects of voltage transients on the locomotive battery lines; and
2. Elimination of damage due to use of a megger on the locomotive wiring.

To the best of applicant's knowledge the circuitry to be described supplied the first practical means of providing power for electronic circuitry from railway locomotive power while protecting the circuitry from the fluctuations and transients in said power.

Figure 8:
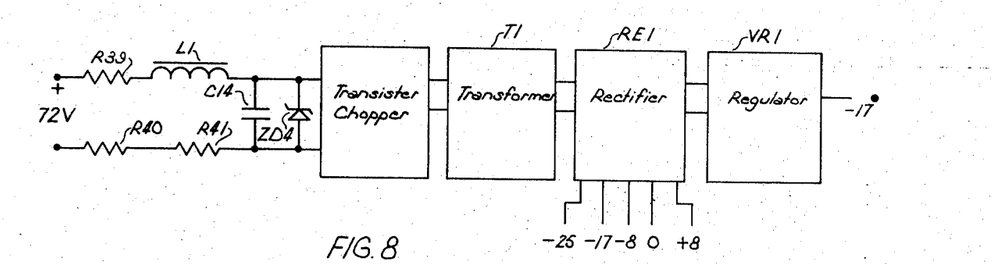
FIG. 8 is a schematic indication of a voltage supply for the circuitry.

In the past, difficulty was experienced in operating electronic equipment directly from the locomotive battery circuit due to large fluctuations or "spikes" in the intended DC potentials which occur frequently and may have magnitudes of 1,000 volts or more. In accord with the preferred design of means for the supply of the direct current voltages as shown in FIG. 8 the positive load from the locomotive battery is led to a transistor chopper circuit through resistance R39 and choke coil L1. The negative lead is connected to the transistor chopper circuit through resistances R40 and R41 in series. A condenser C14 and Zener diode ZD1 are connected in parallel across the positive and negative leads on the side thereof remote from the 72 volt locomotive supply. Zener diode ZD1 is connected, poled to conduct at low voltage, from the negative to positive leads but at a predetermined higher voltage from the positive to negative and the Zener diode is chosen in relation to the supply to be continuously conducting. Through the effects of resistors R40 and R41 the choke coil L1, the capacitor C4 and Zener diode ZD1 shown, any spikes in the supply are substantially eliminated.

The transistor chopper circuit is not shown in detail as it is well known, its purpose being to provide an alternating current from the DC supply. The alternating current is supplied from the transistor chopper circuit to the primary of a transformer T1. The output of the transformer is rectified at rectifier RE1 and in accord with well known techniques the rectified output is designed to supply the −25, −17, −8, 0 and +8 supplies required in the circuitry of FIGS. 2 and 7. An output is also taken from the rectifier to a voltage regulator VR1. The voltage regulator is used to produce the regulated voltages on whose precision the duration or amplitude or of the constant time-amplitude area belongs. The regulator voltage supplies are those indicated with a dot for the monostable multivibrator and transistor switch and the voltage regulator which may be of well known construction.

The purpose of the transformer T1 is to isolate the electronic circuitry from the locomotive battery lines permitting a megger to be used on the locomotive wiring without requiring disconnection of the wheel slip detector.

In the description and the claims herein, with reference to power for the electronic circuitry, reference is made to the use of the "direct current" power from the locomotive. It will be understood that this terminology includes the situation where alternating current is obtained from the locomotive supply then rectified, and the circuitry hereafter described connected thereto.

It will be realized that the means for supplying DC potentials, above described is available, not only for use with the wheel slip detector, but with any other electronic or electric circuitry which it is desired to use on the same locomotive or train.

As previously explained, the graphs indicate the wave shapes at various points in the voltage producing circuit.

OPERATION

In operation the proximity detector provides an approximate sine wave A whose frequency is proportional to the axle on which the proximity detector is mounted.

The high frequency input filter eliminates the unwanted high frequency components which are superimposed upon the sine wave producing signal shaping B. The filtered signal is then supplied through an emitter follower which provides a high impedance to and avoids loading of the proximity detector coil. The signal from the emitter follower is amplified in an input amplifier which is designed to have a predetermined band-pass limited output and to be temperature compensated producing signal shape C. The output of the input amplifier is supplied to a Schmidt Trigger which is adapted to provide, from the amplified sine wave, a square wave shape D of the same frequency. The output from the Schmidt trigger is differentiated to provide pulses corresponding in number to the square wave frequency which are passed through a rectifier to leave pulses of one polarity only — shape E. A monostable multivibrator is provided to be triggered in response to the remaining pulses, to provide a pulse of fixed length (shapes F which are converted to G1 and G2) corresponding to each such pulse, and special temperature compensation means are provided in the multivibrator. The pulses G1 and G2 of fixed duration are applied to a transistor switch which alternately connects precisely regulated voltage supplies to the output, the result being that the transistor switch fed by the pulses G1 and G2 of fixed length provides a signal shape H of fixed duration and fixed magnitude corresponding to each of the pulses. An output filter receives the fixed time magnitude area pulses and provides from them a DC voltage shape I proportional to the applied frequency and thus proportional to the wheel speed.

In any form of the invention, the resultant voltage I may be compared with a corresponding voltage or voltages corresponding to other locomotive axles and the difference used by the comparison used to actuate a wheel slip relay, the wheel slip being evidenced by the difference in potential between the magnitudes of voltage received from different drive axles. In the preferred form of the invention, this comparison is achieved through circuitry adapted to receive such signals I and to provide means for providing actuating a relay in accord with predetermined difference between the slowest axle speed and the fastest axle speed.

I claim:

1. A wheel slip detector comprising a plurality of means, each responsive to the rotation of the locomotive drive axle of an independently mounted locomotive drive wheel slippage of which is to be detected, for producing a corresponding plurality of cyclically varying signals each having a frequency proportional to the rotational speed of the corresponding said axle, means for deriving a like plurality of further signals from said cyclically varying signals each of which is indicative of the corresponding said frequency; and means for comparing said further signals and for producing an output when the difference between the least of said further signals and the greatest of said further signals exceeds a predetermined value, said means for deriving said further signal indicative of frequency comprising means for deriving from said cyclically varying signal, a square wave of frequency varying with said rotation, means for differentiating said square wave to produce pulses, means responsive to such pulses of one sense to produce pulses of substantially equal duration, means responsive respectively to said pulses of substantially equal duration to produce pulses of such duration and substantially constant amplitude, and means responsive to said last mentioned pulses for producing a voltage of magnitude proportional to the frequency of said last mentioned pulses, said means for producing square waves comprising means responsive to axle rotation for producing a periodically varying signal having variations of a frequency proportional to axle rotational frequency, means for amplifying the last mentioned signal, and means for developing from the amplified signal, a square wave of frequency corresponding to said amplified signal,.

said amplifying means comprising an amplifier having its input connected to said square wave developing means, said amplifier being provided with a negative feedback line connecting said output to said input, said feedback line having parallel diodes poled in opposite polarity, each diode being selected to require a predetermined voltage drop across it in its poled conducting direction before conduction commences.

2. A wheel slip detector comprising a plurality of means, each responsive to the rotation of the locomotive drive axle of an independently mounted locomotive drive wheel slippage of which is to be detected, for producing a corresponding plurality of cyclically varying signals each having a frequency proportional to the rotational speed of the corresponding said axle, means for deriving a plurality of further voltage signals from said cyclically varying signals each of which is indicative of the corresponding said frequency; and means for comparing the least of said further signals and the greatest of said further signals and for producing an output when the difference between the least of said further signals and the greatest of said further signals exceeds a predetermined amount, said comparing means comprising a like plurality of pairs of transistors, means for connecting said voltage signals to the base electrodes of the transistors of said pairs of transistors, means for commonly connecting one transistor of each of said pairs of transistors produce a voltage signal substantially equal to the lowest of said voltage signals and means for commonly connecting each of the other transistors of each pair of said pairs of transistors to produce a voltage signal substantially equal to the highest of said voltage signals.

3. A wheel slip detector as claimed in claim 2 wherein a power electrode of each said one transistor is connected to a first common conductor and a power electrode of each said other transistor is connected to a further common conductor, and wherein said last named means further comprises a differential amplifier having first and second inputs connected to said first and further common conductors, respectively.

4. A wheel slip detector comprising a plurality of means, each responsive to the rotation of the locomotive drive axle of an independently mounted drive wheel slippage of which is to be detected, for producing a corresponding plurality of cyclically varying signals each having a frequency proportional to the rotational speed of the corresponding said axle, means for deriving a like plurality of further signals from said cyclically varying signals each of which is indicative of the corresponding frequency, said further signal deriving means including amplifier means for amplifying said cyclically varying signals, said amplifier means including negative feedback line connected between the output and input thereof and comprising a pair of appositely poled diodes connected in parallel for detecting deflections in a said cyclically varying signal of a predetermined amplitude; and means for comparing the least of said further signals and the greatest of said further signals and for producing an output when the difference between the least of said further signals and the greatest of said further signals exceeds a predetermined amount.

5. A detector as claimed in claim 4 wherein said further signal deriving means comprises monostable multivibrator means for converting pulses derived from a said cyclically varying signal into corresponding control pulses of a precise predetermined pulse width, said multivibrator means including a first transistor whose off time determines the pulse width of the control pulses, timing network means for controlling the off time of said first transistor and a second transistor having the emitter-collector circuit thereof connected to the base of said first transistor for compensating for variations in temperature.

* * * * *